US000001848H

United States Statutory Invention Registration [19]

[11] Reg. Number: H1,848

Amin et al.

[45] Published: May 2, 2000

[54] Z-PROPAGATING WAVEGUIDE LASER AND AMPLIFIER DEVICE IN RARE-EARTH-DOPED $LINBO_3$

[76] Inventors: Jaymin Amin, 212 Pearl St., Apt. 1, Corning, N.Y. 14830; John Andrew Aust, 861 9th St., Boulder, Colo. 80302; Norman A. Sanford, 2990 Stanford Ave., Boulder, Colo. 80303; Mark P. Bendett, 4310 Polaris La. N., Plymouth, Minn. 55446

[21] Appl. No.: 08/914,073

[22] Filed: Aug. 18, 1997

Related U.S. Application Data

[60] Provisional application No. 60/023,581, Aug. 19, 1996.

[51] Int. Cl.[7] ..... G02B 6/10

[52] U.S. Cl. ..... 385/132

[58] Field of Search ..... 385/1, 2, 8, 14, 385/15, 129, 130, 131, 132, 141; 372/6

[56] References Cited

U.S. PATENT DOCUMENTS

| | | | |
|---|---|---|---|
| 4,695,121 | 9/1987 | Mahapatra et al. | 385/14 X |
| 4,705,346 | 11/1987 | Miyawaki | 385/14 X |
| 4,717,228 | 1/1988 | Thylen | 385/132 X |
| 4,791,388 | 12/1988 | Sanford et al. | 332/7.51 |
| 4,840,816 | 6/1989 | Appleton et al. | 427/38 |
| 5,128,948 | 7/1992 | Papuchon et al. | 372/21 |
| 5,197,072 | 3/1993 | Harada et al. | 372/21 |
| 5,206,925 | 4/1993 | Nakazawa et al. | 385/142 |
| 5,282,260 | 1/1994 | Buchal et al. | 385/132 |
| 5,473,722 | 12/1995 | Sohler et al. | 385/132 |
| 5,499,256 | 3/1996 | Bischel et al. | 372/28 |
| 5,526,371 | 6/1996 | Shmulovich et al. | 372/68 |

OTHER PUBLICATIONS

S. Thaniyavarn, Wavelength–Independent, Optical–Damage–Immune $LiNbO_3$ TE–TM Mode Convertor, Optics Letters, vol. 11, No. 1, Jan. 1986, pp. 39–41.

A. Donaldson et al, Phase–Matched Mode Converter in $LiNbO_3$, Using Near–A–Axis Propagation, Electronics Letters, vol. 23, No. 25, Dec. 3, 1987.

N.A. Sanford et al, Direct–current Bias Stable Ti:$LiNbO_3$ TE–TM Mode Convertors Produced by Magnesium Post-diffusion, Optics Letters, vol. 12, No. 7, Jul. 1987, pp. 531–5.33.

(List continued on next page.)

*Primary Examiner*—Daniel T. Pihulic
*Attorney, Agent, or Firm*—Emery L. Tracy

[57] ABSTRACT

A rare-earth-doped waveguide device which exhibits stable cw laser and amplifier operation for near-infrared optical pumping in a room-temperature environment is provided. The waveguide device is comprised of an x- or y-cut $LiNbO_3$ substrate on which metal-diffused channel optical waveguides are formed parallel to, or nearly parallel to, the crystallographic z-axis. The $LiNbO_3$ substrate is rare-earth doped either by thermal diffusion of single or multiple rare-earth ions. Alternatively, the rare-earth doped substrate is doped with rare-earth ions during the growth of the crystal from which the substrate was prepared with additional thermal diffusion of rare-earth dopants as required. This orientation of the waveguide channel substantially parallel to the crystallographic z-axis permits reliable laser and amplifier action without the destabilizing effects of photo-refractive optical damage.

27 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

N.A. Sanford et al, Simplified Z–Propagating DC Bias Stable TE–TM Mode Convertor Fabricated in Y–Cut Lithium Niobate, Journal of Lightwave Technology, vol. 6, No. 6, Jun. 1988, pp. 898–902.

M. Fujimura et al, CW and Q–SW Laser Oscillation in Thermally Nd–Diffused Z–Propagation Ti:$LiNbO_3$ Waveguide, 2nd Optoelectronics & Communications Conference Technical Digest, Jul. 1997, pp. 114–115.

J. Amin et al, Tunable Coupled Cavity Waveguide Laser at Room–Temperature in Nd–Diffused Ti:$LiNbO_3$, Optics Letters, vol. 19, 1541 (1994).

R.A. Becker et al, Photorefractive Effects in $LiNbO_3$ Channel Waveguides: Model and Experimental Verification, Applied Physics Letters, 47, 1024 (1985).

C.H. Huang et al, Er–Indiffused Ti:$LiNbO_3$ Channel Waveguide Optical Amplifiers pumped at 980 nm, Electronics Letters, 32, 215 (1996).

R.L. Holman, The Optical Properties and Processing of Lithium Niobate Optical Waveguides, Proceedings SPIE, 408, 14 (1983).

N.A. Sanford et al, Optical Damage Effects in Z–Propagating $LiNbO_3$ Channel Waveguides Fabricated on X–and Y–Cut Substrates, SPIE Vo. 704 Integrated Optical Circuit Engineering IV, pp. 58–61 (1986).

N.A. Sanford et al, Optical Damage Effects in Z–axis Oriented $LiNbO_3$ Channel Waveguides, Proceedings of the Sixth IEEE Int'l Symposium on Applications of Ferroelectrics, pp. 4–7 (1986).

H. Suche, Erbium–Doped Integrated Lasers and Amplifiers, Proc. 7th Eur. Conf. on Int. Opt. pp. 565–570 (1995).

Z-PROPAGATING WAVEGUIDE LASER AND AMPLIFIER DEVICE IN RARE-EARTH-DOPED $LINBO_3$

CROSS-REFERENCE TO RELATED APPLICATIONS

This application is a continuation-in-part of provisional patent application Ser. No. 60/023,581 filed on Aug. 19, 1996, entitled "Z-Propagating Waveguide Lasers in Rare-Earth-Doped $LiNbO_3$".

BACKGROUND OF THE INVENTION

1. Field of the Invention

The present invention relates to rare-earth-doped $LiNbO_3$ laser devices and, more particularly, it relates to z-propagating and near z-propagating waveguide laser devices in rare-earth doped $LiNbO_3$ in which the optical waveguide is oriented parallel or nearly parallel to the crystallographic z-axis of the $LiNbO_3$.

2. Description of the Prior Art

The success of fiber amplifiers and lasers has recently stimulated a great deal of interest in rare-earth-doped planar waveguide devices for providing signal-processing functions on a local scale both in optical communications and sensor systems. In particular, rare-earth-doped $LiNbO_3$ is extremely attractive for signal processing functions since the rare-earth-doped $LiNbO_3$ potentially permits a high degree of integration through a combination of the existing mature waveguide fabrication techniques, the intrinsically good material properties in the rare-earth-doped $LiNbO_3$, and the optical gain produced by the rare-earth ion dopants. Moreover, the incorporation of rare-earth ions in the $LiNbO_3$ crystals by indiffusion demonstrates a degree of versatility not readily available in bulk rare-earth-doped planar waveguide devices.

Numerous integrated laser and amplifier devices have been demonstrated in the past in Nd- and Er-diffused $LiNbO_3$. See J. Amin et al, Opt. Lett. 19, 1541 (1994); H. Suche, *Proceedings of the 7th European Conference on Integrated Optics*, session ThA4 (Delft, 1995), pg. 565. The most common method of waveguide fabrication in rare-earth-diffused $LiNbO_3$ is by Ti-indiffusion allowing for low propagation losses and maintaining the spectral characteristics of the rare-earth ions. However, an inherent problem with Ti:$LiNbO_3$ guided wave devices is the devices' relative instability at visible and near-infrared wavelengths as a result of photorefractive damage induced by the high optical power densities in these guides. This has limited the demonstration of cw room-temperature operation of Nd-doped devices almost exclusively to the case where the waveguides were fabricated by the annealed proton exchange process in MgO:$LiNbO_3$.

Photorefractive damage has also been one of the main reasons that the majority of Er:Ti:$LiNbO_3$ lasers and amplifiers have been pumped at 1480 nm. The only report of a 980 nm pumped Er:Ti:$LiNbO_3$ device is described by Huang et al, Electron. Lett 32,215, 1996. It should be noted that the device described by Huang was only an amplifier. His work demonstrated no laser action. In the Huang et al reference, the detrimental effect of photorefractive damage on the amplifier gain was evident and it is unclear as to whether net gain was obtained in the device. It is widely accepted, however, that the photorefractive effect is due to photogeneration of electrons through ionization of $Fe^{2+}$ impurities in the $Fe^{3+}$ state, and the subsequent migration of these electrons along the z-axis (photovoltaic effect). As described by Becker et al, Appl. Phys. Lett. 47, 1024, 1995, trapping of the electrons, presumably in areas outside the waveguide, results in regions of space charge which perturb the waveguide modes through the electro-optic effect. In general, waveguides are fabricated in $LiNbO_3$ with the propagation direction primarily perpendicular to the crystalline z-axis, in order to use the highest electro-optic coefficient ($r_{33}$) for on-chip modulation. However, the space charge separation caused by the photovoltaic effect is on the order of the mode diameter, and therefore the associated fields remain largely within the waveguide, causing serious perturbation to the guided modes.

As was first reported by Holman, Proc. SPIE 408, 14, 1983, one way of considerably reducing the optical damage is by orienting the waveguide such that light is constrained to propagate substantially parallel to the crystalline z-axis. In this way, the charge separation is then along the guide length, and therefore the overlap between the fields associated with this separation and the optical mode is minimized. A disadvantage for the Holman z-propagation scheme is that it only allows for convenient use of the $r_{22}$ electro-optic coefficient, which is lower than the commonly used $r_{33}$ coefficient by a factor of approximately 9. However, the voltage requirement for switching in a z-propagating waveguide structure can be optimally made to be less than 15 V. Moreover, the effect of temperature changes in this z-propagating waveguide orientation, where both TE and TM modes are ordinary modes, are likely to be less than other orientations as dictated by the temperature-dependent Sellmeier dispersion equations and the associated temperature-dependent birefringence of the material. Also, because the z-propagating waveguide of the Holman reference does not support extraordinary modes, measures do not have to be taken during fabrication to suppress outdiffusion of lithium and spurious extraordinary waveguide modes which are known to arise from such lithium outdiffusion will not occur in the present invention. The fabrication of the present invention is therefore simpler. Even through the work of Holman illustrates the advantage of reduced photorefractive instabilities in optical waveguides which are oriented parallel to the crystallographic z-axis in $LiNbO_3$, published work also exists which illustrates that in some instances the photorefractive damage may be significant. For example, in the paper of Sanford and Robinson, Proceedings of the 6th IEEE International Symposium on Applications of Ferroelectrics, 4 (1986), the authors show data which clearly indicates that the z-propagating waveguide geometry in $LiNbO_3$ may exhibit serious polarization switching photorefractive instabilities. Furthermore, the same authors in a second paper, Proceeding of the SPIE, Vol. 704, 58 (1987), showed that these polarization switching artifacts may occur on the time scale of milliseconds. These polarization switching photorefractive artifacts were found in some cases to be so severe that upwards of 100% of the optical power could be exchanged between TE and TM modes. Consequently, with the work of Holman in conjunction with the work of Suche, in combination with the work of Sanford, a person skilled in the art would conclude that the z-propagating geometry is by no means an a-priori guaranteed success. Only demonstration of the fact that such a laser will indeed function, as done by the inventors of the present invention, and reducing the device to practice, as described herein, is conclusive evidence that such a laser can indeed by realized.

Thus, there is a need for a rare-earth-doped waveguide laser with improved stability at visible and near-infrared wavelengths. There is also a need for a rare-earth-doped waveguide laser with reduced photorefractive damage induced by high power densities. There is still a further need for an Er-doped waveguide laser and amplifier which can effectively be pumped at $\gamma_p$=980 nm given that 980 nm pumping has proven to be more effective than 1480 nm pumping for locally pumped fiber amplifiers and the cost/mW of 980 nm pump diodes is currently lower than that of the 1480 nm diodes.

SUMMARY OF THE INVENTION

It is an object of the present invention to provide rare-earth-doped, or multiple rare-earth-doped, $LiNbO_3$ waveguide lasers which are configured such that the guided optical modes propagate substantially parallel to the crystalline z-axis and can be pumped at any wavelength (from the visible to the near-infrared) as required by the rare-earth-dopant(s), and which produces laser action without concern for photorefractive instabilities which may be introduced by various visible or near-infrared pump wavelengths, i.e., $\gamma_p$ less than 1000 nm or such photorefractive instabilities which may result from the laser action produced by the present invention itself. The waveguide laser device of the present invention has improved stability at visible and near-infrared wavelengths and reduced photorefractive damage, and improved stability when operating as a laser or an optical amplifier.

The present invention is a waveguide device which may be reproducibly fabricated and produces stable cw laser output in a room-temperature environment. The waveguide device comprises a z-propagating structure on either an x-cut or y-cut $LiNbO_3$ substrate having at least one optical waveguide placed substantially parallel to the crystallographic z-axis. Rare-earth ions are incorporated into the $LiNbO_3$ substrate by diffusion in undoped $LiNbO_3$ crystalline plates, or by incorporation into the bulk crystal, from which such plates are cut, as the bulk crystal is grown thereby forming a rare-earth-doped substrate. If the rare-earth ions are incorporated into the $LiNbO_3$ plate by diffusion, the diffusion of the rare-earth species may be distributed over the entire surface of the $LiNbO_3$ plate, incorporating singularly or in combination one or more of the dopant ion species $Er^{3+}$, $Nd^{3+}$, $Yb^{3+}$, and $Tm^{3+}$, or the rare-earth dopant species may be concentrated in localized portions of the $LiNbO_3$ plate by selective diffusion of any required combination or geometric pattern as necessary to obtain doping over only selected areas as required by the design of the laser or amplifier in consideration.

At least one metal-diffused waveguide channel is incorporated into the rare-earth-doped substrate. Each metal-diffused waveguide channel is substantially parallel to the crystallographic z-axis of the $LiNbO_3$ substrate with the waveguide channel and the rare-earth-doped substrate forming a rare-earth-doped z-propagating waveguide wherein the rare-earth-doped z-propagating waveguide provides room-temperature laser operation substantially free from photorefractive instability.

In an embodiment of the waveguide device of the present invention, the rare-earth ions are selected from the group consisting of $Er^{3+}$, $Nd^{3+}$, $Yb^{3+}$, and $Tm^{3+}$. Preferably, the rare-earth ions are selected from one or more of the group consisting of $Er^{3+}$, $Nd^{3+}$, $Yb^{3+}$, and $Tm^{3+}$. If more than one rare-earth ion is used, the multiwavelength operation is possible by pumping at a single wavelength or two different wavelengths depending on which combination of rare-earth ions are selected, i.e., Er/Yb combination is pumped at a single wavelength, near 980 nm for example, then the device will lase near 1550 nm due to the direct excitation of the $Er^{3+}$ ions by the pump in addition to the excitation of the $Er^{3+}$ ions by means of energy transfer from the exited $Yb^{3+}$ ions to the $Er^{3+}$ ions wherein the $Yb^{3+}$ ions were also excited by the pump. Alternatively, if the device is pumped around 945 nm, the $Yb^{3+}$ ions alone will be excited such that they will provide laser action near 1031 nm. Therefore, such a laser, or optical amplifier, pumped near either or both 980 nm and 945 nm could simultaneously produce lasing or optical amplification at near either or both 1550 nm and 1031 nm. Furthermore, the rare-earth ions are preferably indiffused into the $LiNbO_3$ substrate or may have been incorporated into the bulk $LiNbO_3$ crystal when it was grown.

In another embodiment of the waveguide device of the present invention, the $LiNbO_3$ substrate allows multiwavelength operation. Additionally, preferably, the metal channels are metals which increase the refractive index and form a waveguide with the metals being selected from the group consisting of Ti, Zn, Ni, and Cu. Also, the metal channels are preferably diffused into the $LiNbO_3$ substrate.

In yet another embodiment of the waveguide device of the present invention, the rare-earth-doped $LiNbO_3$ substrate which supports an optical waveguide that is oriented substantially parallel to the crystallographic z-axis also has modulator structure in the vicinity of, or overlapping with, the waveguide. It is understood that the rare-earth-doped $LiNbO_3$ substrate may be selected to be either an x-cut or y-cut crystal. The modulator structure could then be used for, either singularly or in combination, mode-locking, Q-switching, or frequency tuning of the waveguide laser device.

In still another embodiment of the waveguide device of the present invention, the waveguide device further comprises a TE-TM polarization switching device formed in the rare-earth doped $LiNbO_3$ substrate which supports optical waveguides oriented parallel, or nearly parallel, to the crystallographic z-axis. Preferably, the switching device allows Q-switching of the waveguide device.

In yet still another embodiment of the waveguide device of the present invention, the waveguide device further comprises a pump light wave or suitable collection of pump light waves. The pump light waves are coupled into the waveguide channel as guided modes and singularly or together provide an excitation source for the rare earth ions composed of one or more of the group consisting of $Er^{3+}$, $Nd^{3+}$, $Yb^{3+}$, and $Tm^{3+}$, In some instances, the pump light may not be constrained as a guided mode and still suitably excite the rare earth ion(s). This may be the case if the pump light is directed at the waveguide channel from the side rather than the end face of the waveguide channel. The suitably-excited rare-earth ions then enable laser action in the waveguide when the endfaces of the waveguide are provided with the proper reflectivity to enable optical feedback at the lasing wavelength, or wavelengths, of interest. Moreover, the present invention acts as an optical amplifier when, in addition to the injection of guided pump light waves into the waveguide, signal light waves of the appropriate wavelengths are also injected as guided modes into the waveguide and experience gain and amplification through interaction with the excited rare-earth ions.

The present invention is also a method of forming optical waveguides oriented parallel or nearly parallel to the crystalline z-axis of the rare-earth-doped substrate. The method comprises selecting an x-cut or y-cut $LiNbO_3$ sample substrate, depositing a film or films of one or more rare-earth metals from the group consisting of Er, Nd, Yb, and Tm, onto the substrate and introducing these by thermal diffusion into the $LiNbO_3$ sample substrate to produce dopants of $Er^{3+}$, $Nd^{3+}$, $Yb^{3+}$, or $Tm^{3+}$ in the $LiNbO_3$ sample substrate. The distribution of these rare-earth dopants diffused into the $LiNbO_3$ substrate may cover completely or partially the surface of the $LiNbO_3$ substrate as required by the operation of the particular laser or optical amplifier in question. Alternatively, $Er^{3+}$, $Nd^{3+}$, $Yb^{3+}$, and $Tm^{3+}$ may already have been incorporated into the rare-earth-doped $LiNbO_3$ plates when the bulk crystal, from which the plates were cut, was grown. The optical waveguides are formed in the rare-earth-doped $LiNbO_3$ plates by depositing, either singularly or a series, of metal stripes which are oriented parallel or nearly parallel to the crystallographic z-axis. The metal stripes are subsequently incorporated into the $LiNbO_3$ by thermal diffusion.

In an embodiment of the method of the present invention, the method further comprises positioning the $LiNbO_3$ sample on a Pt pad, positioning the pad on an alumina pedestal, and placing the $LiNbO_3$ sample, pad, and pedestal into an electric furnace. Further creating a flowing oxygen atmosphere about the $LiNbO_3$ sample, pad, and pedestal as they are heated at high temperature in the electric furnace.

In another embodiment of the method of the present invention, the rare-earth ions are selected from the group consisting of $Er^{3+}$, $Nd^{3+}$, $Yb^{3+}$, and $Tm^{3+}$. Preferably, the rare-earth ions are selected from at least two of the group consisting of $Er^{3+}$, $Nd^{3+}$, $Yb^{3+}$, and $Tm^{3+}$. Furthermore, the rare-earth ions are preferably indiffused into the $LiNbO_3$ substrate.

In yet another embodiment of the method of the present invention, the waveguide channels are formed by the diffusion of metal stripes into the rare-earth-doped $LiNbO_3$ which increases the refractive index of the rare-earth doped $LiNbO_3$ in the areas where the diffused metal stripes are present. The waveguide-forming metals are selected either singularly or multiply, from a group consisting of Ti, Zn, Ni, and Cu.

Further objects, features, and advantages of the present invention will become apparent from a consideration of the following description and the appended claims when taken in connection with the accompanying drawings.

BRIEF DESCRIPTION OF THE DRAWINGS

FIG. 2*b* is a graph illustrating the laser spectrum of the embodiment Er-doped waveguide laser device constructed in accordance with the present invention in which the optical waveguide is oriented parallel or nearly parallel to the crystalline z-axis of the Er-doped $LiNbO_3$ substrate;

FIG. 3*b* is a graph illustrating the laser spectrum of an embodiment of the Nd-doped waveguide laser device constructed in accordance with the present invention in which the optical waveguide is oriented parallel or nearly parallel to the crystalline z-axis of the Nd-doped $LiNbO_3$ substrate;

DETAILED DESCRIPTION OF THE PREFERRED EMBODIMENTS

Figure 1:
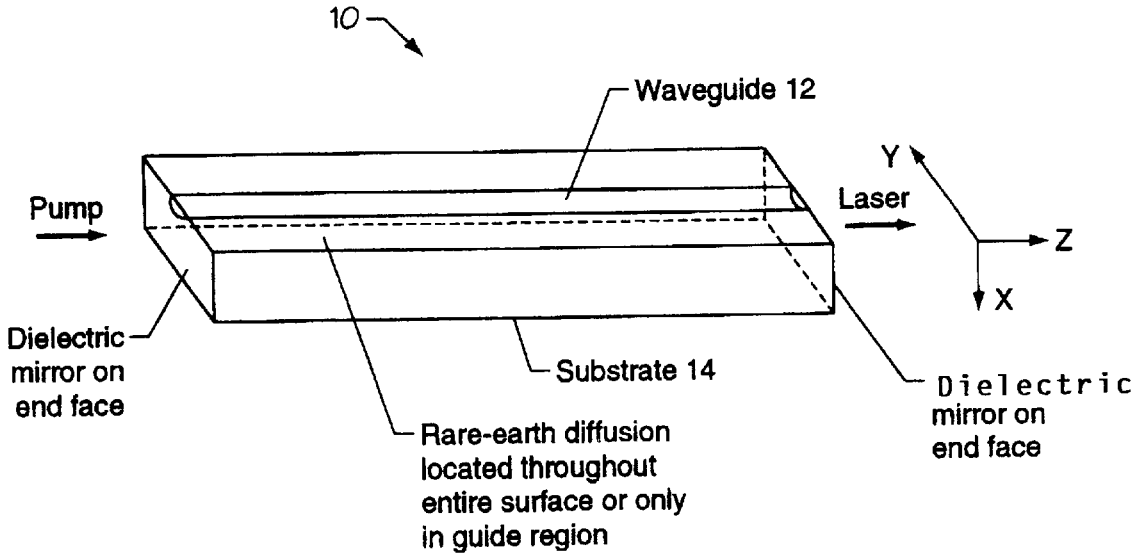
FIG. 1 is a perspective view of illustrating the structure and orientation of the waveguide laser device in which the optical channel is oriented parallel or nearly parallel to the crystalline z-axis of the rare-earth-doped $LiNbO_3$ substrate constructed in accordance with the present invention.
Figure 4A:
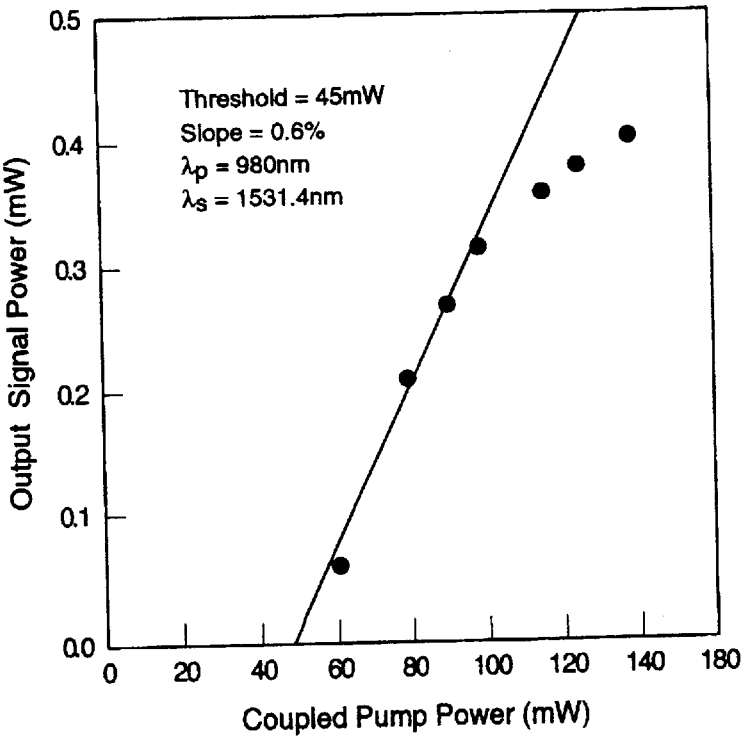
FIG. 4*a* is a graph illustrating the cw laser characteristics of an embodiment of a waveguide laser device in which the rare-earth dopant ions are a combination of $Er^{3+}$ and $Yb^{3+}$ and the optical waveguide is oriented parallel or nearly parallel to the crystalline z-axis of the combined Er- and Yb-doped $LiNbO_3$ substrate. The lasing characteristic shown is from the $Er^{3+}$ ion with the signal being emitted at approximately 1531 nm. The device was pumped at or near 980 nm.
Figure 4B:
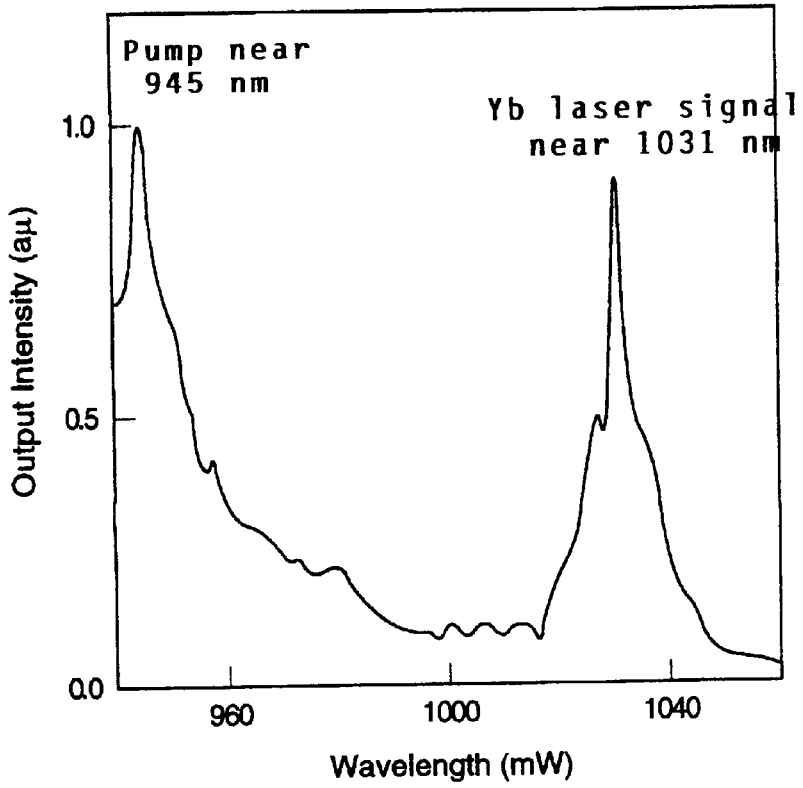
FIG. 4*b* is a graph illustrating the laser spectrum of the embodiment of a waveguide laser device in which the rare-earth dopant ions are a combination of $Er^{3+}$ and $Yb^{3+}$ and the optical waveguide is oriented parallel or nearly parallel to the crystalline z-axis of the combined Er- and Yb-doped $LiNbO_3$ substrate with the laser output near 1031 nm from the excited $Yb^{3+}$ ions being pumped with a pump wavelength near 945 nm, thereby illustrating that, in accordance with the present invention, lasing at multiple wavelengths due to multiple rare-earth dopants are possible.

As illustrated in FIG. 1, the present invention is a z-propagating or near z-propagating waveguide laser device, indicated generally at 10, in rare-earth-doped Ti:$LiNbO_3$, where the rare-earth dopants are composed of Er, Nd, Yb, and Tm, either singularly or in combination, and the optical waveguide channel is placed parallel or nearly parallel to the crystalline z-axis and formed by the diffusion of Ti. The diffusion of other waveguide-forming dopants may be used as described above The waveguide device 10 is made "z-propagating" by configuring the waveguide 12 to be oriented parallel or nearly parallel to the crystallographic z-axis of the substrate 14. The z-propagating geometry allows for the formation of a very efficient TE-TM polarization switching device. It should be noted that the waveguide device 10 can be formed on either an x-cut $LiNbO_3$ plate, as illustrated in FIG. 4*a,* or a y-cut $LiNbO_3$ plate, as illustrated in FIG. 4*b*. The fabrication of such a polarization switch delivers a very efficient and easily realized means for Q-switching, mode-locking, or wavelength tuning the waveguide laser device 10.

Three representative functional examples for embodiments of the present invention are now presented. It should be noted that variations of the processing details presented will also be effective in producing functional laser devices within the scope of the present invention. In describing the construction of the waveguide device of the present invention, three samples, Sample A, Sample B, and Sample C, will be discussed. Fabrication of the rare-earth-doped Ti:$LiNbO_3$ begins by selecting an x-cut or y-cut $LiNbO_3$ sample. Using e-beam techniques, approximately 8 nm of Nd is deposited on sample A and approximately 15 nm of Er is deposited on sample B. The $Nd^{3+}$ ions are then preferably driven into Sample A by indiffusion at approximately 1100° C. over a period of approximately 240 hours, and the $Er^{3+}$ ions are preferably indiffused into Sample B at approximately 1100° C. over approximately 144 hours. On Sample A, Ti stripes approximately 6 μm wide and approximately 90 nm thick are delineated along the z-axis using standard photolithography and vacuum evaporation techniques. A similar process is used on Sample B to form Ti stripes approximately 7 μm wide and approximately 110 nm thick. The Ti is then diffused into both Sample A and Sample B over a period of approximately 9 hours with Sample A being diffused at a temperature of approximately 1005° C. and Sample B being diffused at a temperature of approximately 1030° C. The rare earth diffusions and the waveguide diffusions are preferably conducted in a ceramic tube placed in an electric furnace. Both Sample A and Sample B are next placed on a Pt pad, which in turn is placed on an alumina pedestal with the alumina pedestal placed in the ceramic tube. Oxygen runs through the ceramic tube placed in the electric furnace with a flow rate of 1 liter/minute. Finally, both samples are cut and end-polished, yielding waveguides with a range of different lengths with end-faces that are polished substantially perpendicular to the z-axis.

Another x-cut or y-cut wafer of $LiNbO_3$ referred to as Sample C is also within the scope of the present invention. Using e-beam techniques, a stack of rare-earth ions, consisting of alternating layers of Er and $Yb_2O_3$ are deposited on Sample C. Each individual rare-earth ion layer in the stack is approximately 2 nm thick with the total thickness of the stack being approximately 28 nm. The layers are then diffused into the $LiNbO_3$ substrate at approximately 1100° C., for a total of approximately 360 hours. Ti stripes having a thickness of approximately 110 nm and a width of approximately 7 μm are delineated on the $LiNbO_3$ substrate using standard photolithography. The Ti diffusion is conducted at approximately 1030° C., for approximately 9 hours. All of the Ti diffusions are preferably in flowing oxygen, in an alumina tube placed in an electric furnace with the Sample C sitting on a Pt pad. The finished Sample C device yielded waveguides which were approximately 2 cm long.

It should be noted that while certain variables in time, temperature, and thickness have been set forth above in construction of Sample A, Sample B, and Sample C, it is within the scope of the present invention to use lesser or greater time, temperature, and thickness variables to yield similar results.

Sample A—Nd:Ti:$LiNbO_3$

A near-field analysis was performed on the guides on the Er:Ti:$LiNbO_3$ device using a Nd:YLF laser operating near 1040 nm. At this wavelength, the waveguides were slightly double-moded, with the fundamental mode diameters (1/e full width)5.2(±0.3) μm in width and 2.8(±0.15) μm in depth. The waveguide also supported two transverse modes at approximately 800 nm. Transmission measurements made at 809 and 850 nm revealed a coupling efficiency of 68% in Sample A. With an estimated 20 mW coupled into the waveguide, a single-exponential fluorescence decay was observed, with a 1/e lifetime of 89 μs. The acousto-optic (AO) modulator was then removed, and the lasing characteristics of a 1.8-cm-long device were measured. The device lased in a stable, cw manner at 1093.1 nm with the feedback provided by the 14% Fresnel reflectance from the polished endfaces. Both the pump and laser emission were TE polarized.

Figure 3A:
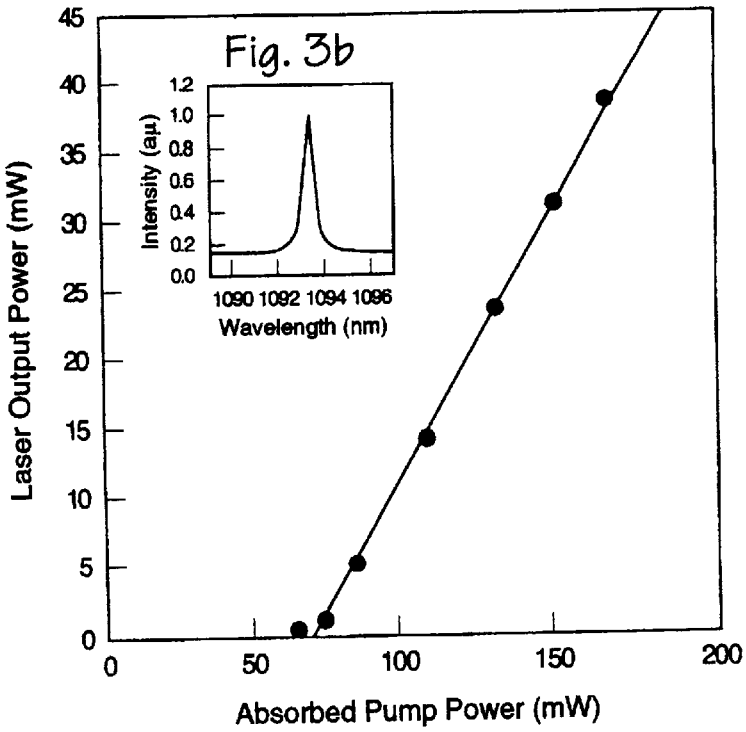
FIG. 3*a* is a graph illustrating the cw laser characteristics of an embodiment of the Nd-doped waveguide laser device in which the optical waveguide is oriented parallel or nearly parallel to the crystalline z-axis of the Nd-doped $LiNbO_3$ substrate with the waveguide laser device being pumped at or near 814 nm and constructed in accordance with the present invention.

FIGS. 3*a* and 3*b* illustrate the lasing characteristics of Sample A, with FIG. 3*b* illustrating a laser spectrum. The output power indicated in FIGS. 3*a* and 3*b* is the total power from the pumped and unpumped end of the device. For the case of this particular example, the absorbed pump power was 70% of that launched. The threshold for laser oscillation was 68 mW of absorbed pump power, and the slope efficiency was 40%. The inventors of the present invention were able to extract approximately 40 mW from Sample A, limited only by the available pump power, without any discernible sign of photorefractive damage. Note that the performance of this laser is representative only for the case described. Attaching mirrors with various reflectivities to the end facets of the waveguide device will result in modified laser behavior in terms of the output power, the precise output wavelength, and the laser threshold.

Sample B—Er:Ti:$LiNbO_3$

Figure 2A:
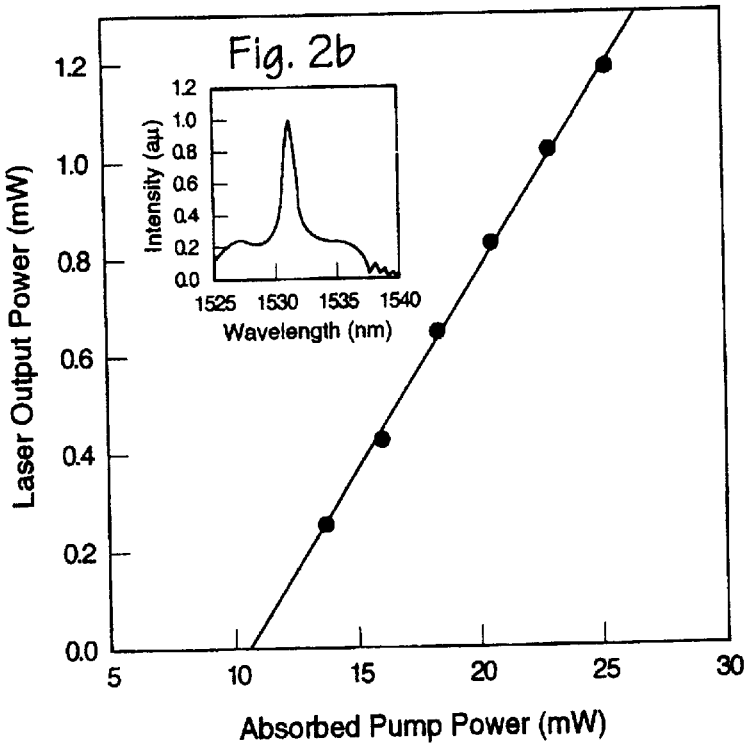
FIG. 2*a* is a graph illustrating the cw laser characteristics of an embodiment of the Er-doped waveguide laser device in which the optical waveguide is oriented parallel or nearly parallel to the crystalline z-axis of the Er-doped $LiNbO_3$ substrate with the waveguide laser being pumped at or near 980 nm and constructed in accordance with the present invention.

Near-field analysis was carried out on the Er:Ti:$LiNbO_3$ device using a 1.5 μm light-emitting diode (LED), revealing the 7-μm-wide Er:Ti:$LiNbO_3$ waveguides to be single-moded at this wavelength, with 1/e mode diameters of 7.9 μm×4.6 μm (width×depth). The guides supported three transverse modes at 980 nm. Laser characteristics were measured in this 2.9-cm-long device, with cw pumping from the Ti:$Al_2O_3$ at 980 nm. The pump mode was TE polarized. A mirror with a reflectivity of >99% at 1530, and which transmitted 85% of the pump, was attached to the front face of the device and fluorinated liquid provided index-matching. At the output end of the device, no mirror was attached, and Fresnel reflection from the polished end-face was used to complete the laser cavity. The device operated very stably, with the output TE polarized; FIGS. 2*a* and 2*b* illustrate the cw laser characteristics. In particular, FIG. 2*b* illustrates the laser output spectrum which occurs near 1531.4 nm. For the particular reflectivities of the mirrors attached to the end facets of the waveguide laser device, the lasing threshold was approximately 10.5 mW of absorbed pump power and the device exhibited a slope efficiency of 8.5%. Stable laser output at power of 1 mW near 1550 nm was obtained. In general, it was possible to make the device lase by attaching to the end facets a wide selection of mirrors that had various reflectivities. Furthermore, the laser would still operate if no mirrors were attached and only the Fresnel reflection of the end facets provided the optical feedback.

Sample C—Er:Yb:Ti:$LiNbO_3$

Near field analysis was carried out on the Er:Yb:Ti:L-$iNbO_3$ device using a 1550 nm LED revealing the waveguides to be single moded, with 1/e mode intensity diameters of approximately 7.9 (±0.4) μm×4.6 (±0.25) μm. The guide supports three transverse modes at 980 nm. Laser characteristics were measured in Sample C, with cw pumping at 980 nm, with a high reflector at the input end and a 95% reflector at the output end. The device lased in a stable cw mode at approximately 1531.4 nm, with a threshold of approximately 45 mW of coupled pump power and a slope efficiency of approximately 0.6%.

The laser characteristics of Sample C are best illustrated in FIG. 4*a*. The laser waveguide was pumped at or near 980 nm where the pump light directly excited the $Er^{3+}$ dopant ions and also excited the $Yb^{3+}$ dopant ions which in turn transferred their energy to the $Er^{3+}$ dopant ions. Laser action near 1531 nm from the excited $Er^{3+}$ ions then resulted. The presence of the $Yb^{3+}$ ions thus enabled more efficient optical pumping of the $E^{3+}$ lasing ions than would be possible if the $Er^{3+}$ ions were the sole rare-earth dopant.

Mirrors with high reflectivity near 1060 nm were attached to the waveguide laser end faces to promote lasing from the $Yb^{3+}$ ions. The laser would then operate near 1031 nm which is the peak which the maximum gain in the Yb:$LiNbO_3$ emission spectrum when pumped near 945 nm. This is an illustration of selecting laser action from the $Yb^{3+}$ dopants alone, even with the $Er^{3+}$ dopants present, by tuning the pump light wavelength to a range where the $Yb^{3+}$ is primarily sensitive. The laser output spectrum is illustrated in FIG. 4*b*. It is also possible that with appropriate choice of mirrors, the device can be made to lase simultaneously near 1030 nm and near 1530 nm by pumping near 980 nm.

Conclusion

The z-propagating waveguide laser device of the present invention is a stable, room-temperature operating laser fabricated by Ti-indiffusion in rare-earth-doped $LiNbO_3$. The z-propagation scheme has been utilized in constructing the z-propagating waveguide laser device of the present invention thereby allowing effective curbing of the instabilities arising from photorefractive optical damage. During experimentations with a z-propagating waveguide laser device constructed in accordance with the present invention, a Nd:Ti:$LiNbO_3$ waveguide laser device lased continuously using only the polished endfaces to provide feedback. The absorbed pump power at threshold was approximately 68 mW and the slope efficiency was approximately 40%. A similar z-propagating Er:Ti:$LiNbO_3$ waveguide laser device constructed in accordance with the present invention was made to lase by pumping at approximately 980 nm, with an absorbed pump threshold of approximately 10.5 mW and a slope efficiency of approximately 8.5%, obtained using a high reflector on the input face and only the polished output face as the second mirror. Further yet, a z-propagating Er/Yb-doped Ti$LiNbO_3$ waveguide laser device constructed in accordance with the present invention was made to lase by pumping at approximately 945 nm with stable lasing at approximately 1031 nm at a threshold of approximately 120 mW of coupled pump power.

When pumped by a suitable light source, optical feedback is provided from the end-facets of the waveguide by attaching to the end-facets suitable mirrors that enable laser action of the excited rare-earth ions and do not impede or restrict the injection of pump light into the waveguide device. The mirrors may be directly deposited on the waveguide end-facets by means of well-known vacuum evaporation techniques for dielectric thin films. Alternatively, the mirrors may be separately formed on thin transparent substrates of a suitable material and mechanically attached to the waveguide end-facets with optical adhesives or clips.

Figure 5:
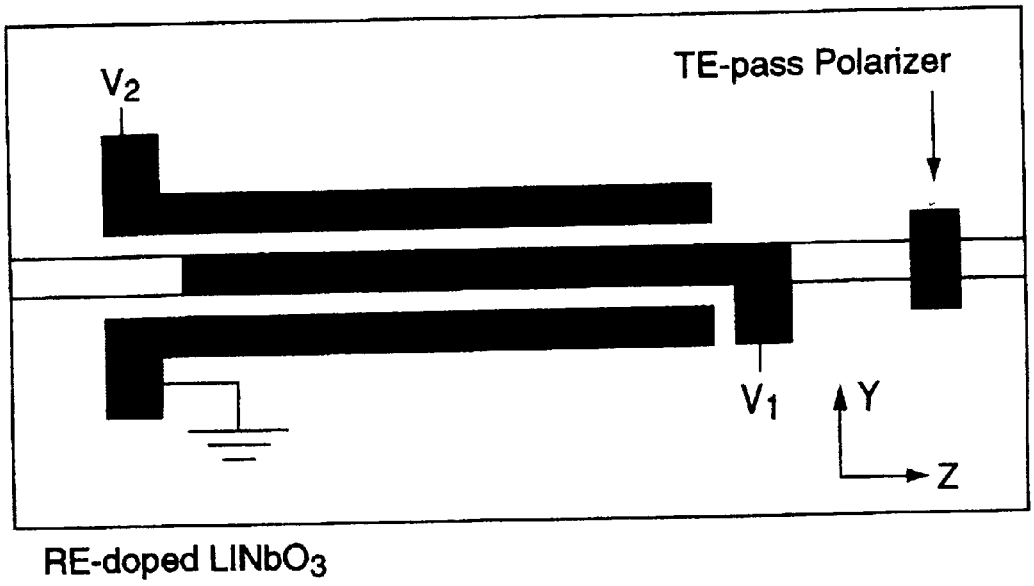
FIG. 5 is a plan view illustrating a modulator structure constructed in accordance with the present invention that can phase-modulate, polarization modulate, or amplitude modulate guided waveguide modes in optical waveguides fabricated parallel or nearly parallel to the crystalline z-axis of an x-cut $LiNbO_3$ substrate.
Figure 6:
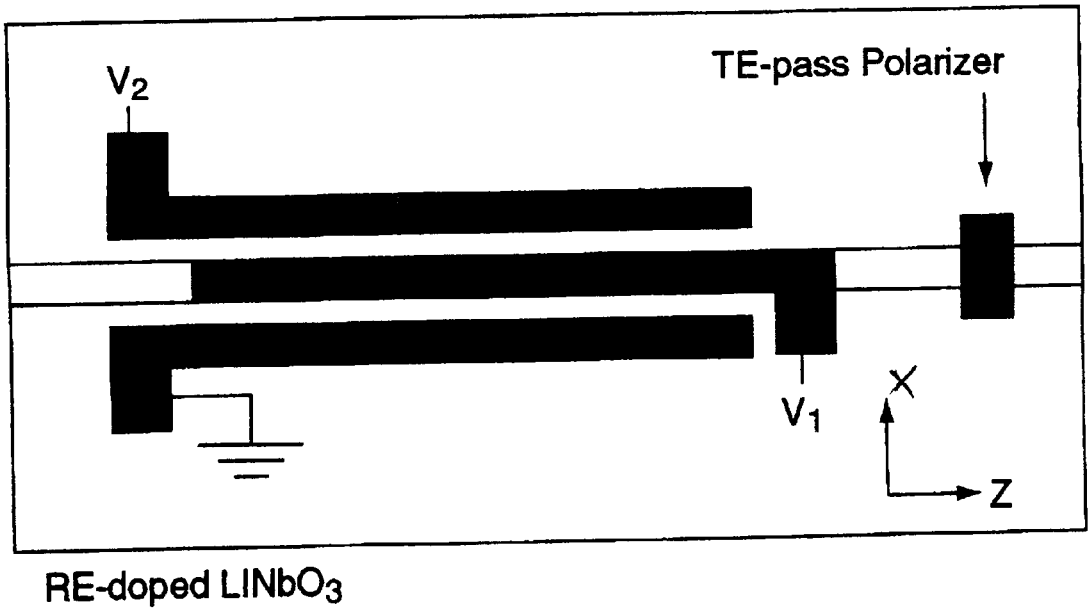
FIG. 6 is a plan view illustrating a modulator structure constructed in accordance with the present invention that can phase-modulate, polarization modulate, or amplitude modulate guided waveguide modes in optical waveguides fabricated parallel or nearly parallel to the crystalline z-axis of a y-cut $LiNbO_3$ substrate.

FIGS. 5 and 6 illustrate plan views of a modulator structure that can phase-modulate, polarization modulate, or amplitude modulate guided waveguide modes in optical waveguides fabricated parallel or nearly parallel to the crystalline z-axis of x-cut $LiNbO_3$ or y-cut $LiNbO_3$ plates. Fabrication of a modulator structure on the waveguide laser device described in the present invention will enable greater functionality by enabling mode-locking, of the waveguide laser, Q-switching of the waveguide laser, or separately controlling the polarization of the waveguide laser and allow wavelength tuning of the waveguide laser. Furthermore, all four of these functions, i.e., mode-locking, Q-switching, polarization control, and wavelength tuning, can occur simultaneously or separately as required by the intended use of the present invention. The voltages V2 and V1 as indicated in FIGS. 5 and 6 control the degree of phase modulation and TE-TM polarization conversion. The TE pass polarizer illustrated in FIGS. 5 and 6 enables Q-switching by means of providing amplitude modulation of the laser through polarization switching and therefore loss modulation of the TE lasing mode. Additionally, the modulator structure may be used in such a manner that it will enable, either continuous or discrete, wavelength tuning of the laser output of the rare-earth-doped $LiNbO_3$ waveguide laser.

Furthermore, the waveguide laser device described in the present invention can be mode-locked, Q-switched or simultaneously mode-locked and Q-switched by attaching a semiconductor saturable absorber to the end facet of the waveguide rather than, or in combination with, the electrode structures described above.

The discovery and demonstration of a rare-earth doped $LiNbO_3$ waveguide laser device, especially an Er:$LiNbO_3$ waveguide laser device, pumped at approximately 980 nm is a very important result, in view of the inexpensive and readily available pump laser diodes at the 980 nm wavelength. The discovery also opens up many opportunities for advanced active and passive circuits incorporating, for example, on-chip wavelength division multiplexers for independent pump and signal routing.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A waveguide device for operating as a stable optical amplifier or a waveguide laser in a room-temperature environment, the waveguide device comprising:

a $LiNbO_3$ substrate having a crystallographic z-axis;

rare-earth ions incorporated into the $LiNbO_3$ substrate, the rare-earth ions and $LiNbO_3$ substrate forming a rare-earth-doped substrate;

at least one metal diffused waveguide channel incorporated into the rare-earth-doped substrate, each metal-diffused waveguide channel being substantially parallel or nearly parallel to the crystallographic z-axis of the $LiNbO_3$ substrate, the waveguide channel and the rare-earth-doped substrate forming a rare-earth-doped z-propagating waveguide;

end facets formed on the rare-earth-doped z-propagating waveguide, the end facets substantially perpendicular to the axis of the waveguide; and wherein the rare-earth-doped z-propagating waveguide providing stable room-temperature operation as an optical amplifier or as a waveguide laser, both substantially free from photorefractive instability.

2. The waveguide device of claim 1 wherein the rare-earth ions are selected from one or more of the group consisting of $Er^{3+}$, $Nd^{3+}$, $Yb^{3+}$, and $Tm^{3+}$.

3. The waveguide device of claim 1 wherein the rare-earth ions are indiffused into the $LiNbO_3$ substrate.

4. The waveguide device of claim 1 wherein the rare-earth ions are incorporated into the $LiNbO_3$ substrate during formation of the $LiNbO_3$ substrate.

5. The waveguide device of claim 1 wherein the metal channels are metals which increase the refractive index and form a waveguide, the metals being selected from one or more of the group consisting of Ti, Zn, Ni, and Cu.

6. The waveguide device of claim 1 wherein the metal channels are thermally diffused into the $LiNbO_3$ substrate thereby forming optical waveguides.

7. The waveguide device of claim 1 wherein the z-propagating substrate has a modulator structure selected from the group consisting of an x-cut $LiNbO_3$ plate and a y-cut $LiNbO_3$ plate.

8. The waveguide device of claim 1 and further comprising a TE-TM polarization switching device formed on the z-propagating $LiNbO_3$ substrate, the switching device allowing Q-switching, mode locking, or wavelength tuning of the waveguide device.

9. The waveguide device of claim 1 and further comprising a suitably-generated pump light injected into the rare-earth-doped waveguide exciting the rare-earth ions and enabling cw laser action and amplification of the rare-earth-doped waveguide device.

10. The waveguide device of claim 9 and further comprising mirrors mounted to the end facets of the waveguide device enabling laser action of the excited rare-earth ions free from impeding the injection of the pump light into the waveguide device.

11. The waveguide device of claim 1 and further comprising a modulator electrode structure fabricated on the surface of the substrate nearingly approximate the waveguide, and further comprising means for providing suitable switching voltages to the modulator electrodes.

12. The waveguide device of claim 10 wherein the modulator structure enables phase modulation and polarization switching of the guided optical modes.

13. The waveguide device of claim 10 and further comprising an attenuator absorbing or scattering either the TE or TM guided modes.

14. The waveguide device of claim 10 and further comprising pump light injected into the rare-earth-doped waveguide, wherein the waveguide laser simultaneously operates as a mode-locked and Q-switched laser or only as a mode-locked laser.

15. The waveguide device of claim 1 and further comprising a semiconductor saturable absorber connected to at least one or both, as required, of the waveguide facets enabling the waveguide laser to operate mode-locked, Q-switched, or simultaneously mode-locked and Q-switched.

16. The waveguide device of claim 9 and further comprising a guided signal light injected into the waveguide, the guided signal light having a predetermined wavelength to interact with the excited rare-earth dopants such that the signal light is amplified by the excited rare-earth dopant whereupon exiting the output face of the waveguide, the signal light is amplified to a greater optical power than when the signal light was presented at the input face of the waveguide device.

17. The waveguide device of claim 9 wherein the device is pumped with single or multiple wavelengths and lasing, in either cw, mode-locked, Q-switched, or combined mode-locked and Q-switched, at single or multiple wavelengths.

18. The waveguide device of claim 16 wherein the pump light is pumped with single or multiple wavelengths producing amplification of single or multiple injected signal light waves at various wavelengths.

19. The waveguide device of claim 9 and further comprising means for electro-optic tuning and adjustment of the output lasing wavelength by applying a suitable voltage to an electrode position on or nearingly adjacent to the waveguide channel or channels.

20. The waveguide device of claim 9 and further comprising a distributed Bragg reflector structure for providing the necessary feedback of the signal wave back into the waveguide laser cavity with the fabrication of the distributed Bragg reflector structure following from standard etching procedures forming shallow surface corrugations on the surface of the channel waveguides.

21. A method of forming a z-propagating waveguide, the method comprising:

selecting an x-cut or y-cut $LiNbO_3$ sample;

depositing a rare-earth material on the $LiNbO_3$ sample;

incorporating ions of the rare earth material into the sample;

delineating metal channels on the $LiNbO_3$ sample; and incorporating the metal channels into the $LiNbO_3$ sample.

22. The method of claim 21 and further comprising:

positioning the $LiNbO_3$ sample on a Pt pad;

positioning the pad on an alumina pedestal;

positioning the alumina pedestal in a furnace;

subjecting the $LiNbO_3$ sample, pad, and pedestal to a flowing oxygen atmosphere; and heating the alumina pedestal, Pt pad, $LiNbO_3$ sample to a temperature in the range of approximately 1000° C. to 1100° C. for predetermined period of time.

23. The method of claim 21 wherein the rare-earth ions are selected from one or more of the group consisting of $Er^{3+}$, $Nd^{3+}$, $Yb^{3+}$, and $Tm^{3+}$.

24. The method of claim 21 wherein the rare-earth ions are thermally indiffused into the $LiNbO_3$ substrate.

25. The method of claim 21 wherein the rare-earth ions are incorporated into the $LiNbO_3$ substrate during the growth of the bulk crystal.

26. The method of claim 21 wherein the metal channels are metals which increase the refractive index and form a waveguide, the metals being selected from one or more of the group consisting of Ti, Zn, Ni, and Cu.

27. The method of claim 21 wherein the metal channels are thermally diffused into the $LiNbO_3$ substrate.

* * * * *